(12) United States Patent
Ohtsuka et al.

(10) Patent No.: US 6,226,319 B1
(45) Date of Patent: May 1, 2001

(54) SPREAD SPECTRUM DEMODULATION CIRCUIT, SPREAD SPECTRUM COMMUNICATION APPARATUS, DELAY-DETECTION-TYPE DEMODULATION CIRCUIT, AND DELAY-DETECTION-TYPE COMMUNICATION APPARATUS

(75) Inventors: Masatoshi Ohtsuka, Fukuoka; Naoki Koga, Fukuoka-ken, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/152,512

(22) Filed: Sep. 14, 1998

(30) Foreign Application Priority Data

Sep. 22, 1997 (JP) .................................. 9-256330

(51) Int. Cl.$^7$ ................................................. H04B 1/707
(52) U.S. Cl. ......................................... 375/151; 375/153
(58) Field of Search ................................. 375/142, 143, 375/144, 148, 150, 153

(56) References Cited

U.S. PATENT DOCUMENTS 5,909,461 * 6/1999 Koga et al. ......................... 375/206
6,020,672 * 2/2000 Yokota et al. ................... 310/313 R

* cited by examiner

*Primary Examiner*—Chi Pham
*Assistant Examiner*—Mohammed Lachhab
(74) *Attorney, Agent, or Firm*—Venable; Robert J. Frank; Allen Wood

(57) ABSTRACT

A spread spectrum demodulation circuit includes a correlation signal generator which generates a correlation signal from a reception signal to which a quadrature phase shift keying and a spread spectrum modulation are performed. First and second delay elements have different delay times, and delay the correlation signal to obtain first and second delay signals, respectively. First and second adders add the correlation signal and the first and second delay signals to obtain first and second addition signals, respectively. First and second distributors distribute the first and second addition signals, respectively. First and second multiplication circuits obtain first and second multiplication signals from distributed signals inputted from the first and second distributors, respectively. A data demodulation circuit demodulates the first and second multiplication signals to recover a transmission information signal.

24 Claims, 10 Drawing Sheets

| A | A | B | D | A | C | B |

(d) S12

| B' | A' | A' | B' | D' | A' | C' |

(e) S13

(f) S14

(g) D13   1   0   0   1   0   1   1

(h) S15

| B" | A" | A" | B" | D" | A" | C" |

(i) S16

(j) S17

(k) D14   0   0   1   1   1   1   0

(l) D15   1 0 0 0 0 1 1 1 0 1 1 1 1 0

(a) D21  1 0 0 0 0 1 1 1 0 1 1 1 1 0

(b) D22  1 0 1 0 0 0 1 1 1 0 0 1 0 0
            A   A   B   D   A   C   B (c) S21 
        A   A   B   D   A   C   B (d) S22 
        B'  A'  A'  B'  D'  A'  C'

(e) S23

(f) D23  1 0 0 1 0 1 1

(g) S24 
        B"  A"  A"  B"  D"  A"  C"

(h) S25

(i) D24  0 0 1 1 1 1 0

(j) D25  1 0 0 0 0 1 1 1 0 1 1 1 1 0

(k) S26

SPREAD SPECTRUM DEMODULATION CIRCUIT, SPREAD SPECTRUM COMMUNICATION APPARATUS, DELAY-DETECTION-TYPE DEMODULATION CIRCUIT, AND DELAY-DETECTION-TYPE COMMUNICATION APPARATUS

BACKGROUND OF THE INVENTION

1. Field of the Invention

The present invention relates to a spread spectrum demodulation circuit and spread spectrum communication apparatus for demodulating a transmission information signal from a reception signal to which a quadrature phase shift keying and a spread spectrum modulation are performed.

Further, the present invention relates to a delay-detection-type demodulation circuit and delay-detection-type communication apparatus for demodulating a transmission information signal from a reception signal to which a quadrature phase shift keying is performed.

2. Description of the Related Art

A spread spectrum communication scheme (SS communication scheme) has recently been paid attention as a private communication system, because of high resistance to noises and excellency of security and secrecy. In the SS communication scheme, a carrier wave which is phase-modulated by information to be transmitted (transmission information) is spread-spectrum-modulated (SS modulated) by a predetermined code sequence having a predetermined high chip rate, to thereby obtain a spread spectrum signal (SS signal) used as a transmission signal. The code sequence includes a pseudo noise code sequence (PN code sequence) or a Barker code sequence, and the SS modulation scheme includes a direct spread scheme (DS scheme) and a frequency hopping scheme (FH scheme).

In the SS communication system, it is necessary for a receiver to have a demodulator for demodulating the transmitted SS signal. For example, if the carrier wave is SS-modulated through the DS scheme using the PN code sequence, the receiver demodulates it by using the same PN code sequence as that used by the transmitter. A demodulator to be used for such a purpose is broadly classified into a demodulator using an IC and a demodulator using a surface acoustic wave element. The surface acoustic wave element to be used for the demodulator can be realized cost effectively and in simple structure by utilizing photolithography, and so the demodulator of this type is being paid attention.

The surface acoustic wave element is classified from its configuration into a surface acoustic wave matched filer and a surface acoustic wave convolver. Since the surface acoustic wave convolver can select the PN code sequence for demodulation, it is particularly suitable for the field where security and secrecy are required. Since the surface acoustic wave matched filter uses a fixed code sequence for demodulation, a peripheral circuit can be simplified correspondingly and the whole system can be made inexpensive. Therefore, the surface acoustic wave matched filter is being paid attention for use with a demodulator for a small SS communication system such as an intra-radio LAN. Various types of surface acoustic wave matched filters and demodulators using such matched filters have been proposed.

A conventional demodulation circuit using a surface acoustic wave matched filter compatible with a quadrature phase shift keying scheme (QPSK scheme) is shown in a block diagram of FIG. 10. FIG. 10 illustrates a conventional spread spectrum demodulation circuit (SS demodulation circuit). The demodulation circuit comprises a correlation signal generator 51, a first delay element 52a, a first adder 53a for adding a correlation signal output from the correlation signal generator 51 and an output signal (first delay signal) of the first delay element 52a, signal lines 54a and 55a, and a first reproduction circuit 56a for reproducing data from an output signal (first addition signal) of the first adder 53a. For signal inputs to the first adder 53a, the delay amount of the first delay element 52a is set so that the input signal (first delay signal) from the first delay element 52a is delayed from the input signal (correlation signal) from the correlation signal generator 51 by $T+(\pm n+5 \times a/8)/fc$, where T represents one period of a reception signal to be demodulated, n represents an integer from "0" to a value equal to or smaller than a ratio multiplied by "2" of the carrier frequency fc of a signal input to a means for retrieving correlation signal to a chip rate, and $1/2 \leq a \leq 3/2$.

The demodulation circuit further comprises a second delay element 52b, a second adder 53b for adding the correlation signal output from the correlation signal generator 51 and an output signal (second delay signal) of the second delay element 52b, signal lines 54b and 55b, a second reproduction circuit 56b for reproducing data from an output signal (second addition signal) of the second adder 53b, and a synthesizing circuit 57 for synthesizing output data of the first reproduction circuit 56a and output data of the second reproduction circuits 56b. A data demodulation circuit 58 is constituted of the first and second reproduction circuits 56a and 56b and the synthesizing circuit 57. For signal inputs to the second adder 53b, the delay amount of the second delay element 52b is set so that the input signal (second delay signal) from the second delay element 52b is delayed from the input signal (correlation signal) from the correlation signal generator 51 by $T+(\pm m-5 \times a/8)/fc$, where m represents an integer from "0" to a value equal to or smaller than a ratio multiplied by "2" of a carrier frequency fc of a signal input to a means for retrieving correlation signal to a chip rate. It is preferable that n=0, m=0, and a=1.

FIG. 11 is a phase transition diagram showing the phase states of the surface acoustic wave matched filer and delay elements during demodulation of a signal compatible with the QPSK scheme. In FIG. 11, (A, B, C, D) indicates four phase states, i.e. A(10), B(00), C(01) and D(11), corresponding to the QPSK scheme in the output signal of the surface acoustic wave matched filter. Assuming that a=1, (A', B', C', D') indicates the phase states of the signal delayed in the first delay element 52a by $T+(\pm n+5/8)/fc$, and (A", B", C", D") indicates the phase states of the signal delayed in the second delay element 52b by $T+(\pm m-5/8)/fc$. For example, when the signal in the state A is delayed in the first delay element 52a by $T+(\pm n+5/8)/fc$, the state A transits to the state A'. When the signal in the state A is delayed in the second delay element 52b by $T+(\pm m-5/8)/fc$, the state A transits to the state A".

In FIG. 12, (a) illustrates a timing of the information signal to be transmitted (transmission information signal) D21; (b) illustrates a timing of a signal D22 which is obtained by subjecting the differential coding (to be later described) to the transmission information signal D21; (c) illustrates a timing of a correlation signal S21 output from the correlation signal generator 51; (d) illustrates a timing of a first delay signal S22 delayed in the first delay element 52a by $T+(\pm n+5/8)/fc$; (e) illustrates a timing of a first addition signal S23 obtained by adding the correlation signal S21 and the first delay signal S22; (f) illustrates a timing of data D23 reproduced from the first addition signal S23 in the first reproduction circuit 56a; (g) illustrates a timing of a second delay signal S24 delayed in the second delay element 52b by T+(±m−5/8)/fc; (h) illustrates a timing of a second addition signal S25 obtained by adding the correlation signal S21 and the second delay signal S24; (i) illustrates a timing of data D24 reproduced from the second addition signal S25 in the second reproduction circuit 56b; (j) illustrates a timing of an information signal D25 obtained by synthesizing in the synthesizing circuit 57 the data D23 reproduced in the first reproduction circuit 56a and the data D24 reproduced in the second reproduction circuit 56b; and (k) illustrates a timing of an actual signal waveform S26. That is, in (c) to (e), (g) and (h) of FIG. 12, only envelopes are shown for simplifying, but the actual signal waveform is similar to the signal waveform S26.

Next, the operation of the SS demodulation circuit shown in FIG. 10 will be described with reference to FIGS. 11 and 12. In the following, it is assumed that the differential coding of the transmission information signal D21 is performed in the transmitter. When the differential coding (DD2(i)=DD1(i)+DD2(i−1)) is subjected to the transmission information signal D21 (10000111011110: repetitive data of phase information ABCDCDA), the transmission information signal D21 is changed to a signal D22 (10100011100100: AABDACB) (see (a) and (b) in FIG. 12). Therefore, in the SS demodulator unit, the output signal (correlation signal) of the correlation signal generator 51 has an output waveform S21 with the phase information corresponding to the differential-coded information (see (c) in FIG. 12). When the correlation signal S21 and the output signal (first delay signal) S22 having the phase information (B'A'A'B'D'A'C') delayed by T+(±n+5/8)/fc in the first delay element 52a (see (d) in FIG. 12) are added in the first adder 53a, the output waveform S23 is obtained (see (e) in FIG. 12). Because a large addition waveform is obtained when the output signal having the phase information A is added to an output waveform having the phase difference of ±45 degrees such as B' or C', whereas a small addition waveform is obtained when the output signal having the phase information A is added to an output waveform having the phase difference of ±225 degrees such as A' or D'. When the correlation signal S21 and the output signal (second delay signal) S24 having the phase information (B"A"A"B"D"A"C") delayed by T+(±m−5/8)/fc in the second delay element 52b (see (g) in FIG. 12) are added in the second adder 53b, the output waveform S25 is obtained (see (h) in FIG. 12). Because a large addition waveform is obtained when the output signal having the phase information A is added to the output waveform having the phase difference of ±45 degrees such as C" or D", whereas a small addition waveform is obtained when the output signal having the phase information A is added to the output waveform having the phase difference of ±225 degrees such as A" or B". Clocks are generated from the waveforms of the first and second addition signals S23 and S25. The data D23 (see (f) in FIG. 12) is reproduced by setting the output waveform S23 having the large level to "1" and that having the small level to "0" in the first reproduction circuit 56a. Further, the data D24 (see (i) in FIG. 12) is reproduced by setting the output waveform S25 having the large level to "1" and that having the small level to "0" in the second reproduction circuit 56b. Then, the data D23 and the data D24 are synthesized in the synthesizing circuit 57 to obtain the demodulated data D25 (10000111011110) (see (j) in FIG. 12). As a result, the signal compatible with the QPSK scheme can be demodulated to recover the original data D21. That is, the difference of delay amount between the first and second delay elements 52a and 52b is (T+(±n+5/8)/fc);−(T+(±m−5/8)/fc)=(±(n+m)+1)/fc+(1/4)/fc, and therefore the demodulation for the QPSK scheme can be performed. Because the first term of the right side is 2π in terms of phase, so that the phase difference becomes 90 degrees only under consideration of the second term.

As mentioned above, the SS signal of the QPSK scheme can be demodulated by using the simple configuration which includes the surface acoustic wave matched filer, the delay elements 52a and 52b having different delay amounts, the adders 53a and 53b, and the data demodulation circuit 58.

However, the ratio between levels "1" and "0" of the addition signal from the adder is theoretically about 2.413. Therefore, in the conventional SS demodulator, if noises become large and the S/N ratio becomes low, the data reproduction cannot be performed correctly and the error rate increases.

SUMMARY OF THE INVENTION

In order to solve the above problem associated with the conventional spread spectrum demodulation circuit and spread spectrum communication apparatus and the conventional delay-detection-type demodulation circuit and delay-detection-type communication apparatus, it has been desired in the QPSK scheme to increase the ratio between levels "1" and "0" of data input to the data demodulation circuit.

An object of the present invention is to provide a spread spectrum demodulation circuit compatible with a QPSK scheme in which a ratio between levels "1" and "0" of data input to a data demodulation circuit can be theoretically improved to 5.828 and the reliable data reproduction can be performed even if there are external noises, and a spread spectrum communication apparatus using such a spread spectrum demodulation circuit.

Another object of the present invention is to provide a delay-detection-type demodulation circuit compatible with a QPSK scheme in which a ratio between levels "1" and "0" of data input to a data demodulation circuit can be theoretically improved to 5.828 and the reliable data reproduction can be performed even if there are external noises, and a delay-detection-type communication apparatus using such a delay-detection-type demodulation circuit.

In order to achieve the object, a spread spectrum demodulation circuit according to the present invention comprises: a correlation signal generator for generating a correlation signal from a reception signal to which a quadrature phase shift keying and a spread spectrum modulation are performed; first and second delay elements having different delay times for delaying the correlation signal to obtain first and second delay signals, respectively; first and second adders for adding the correlation signal and the first and second delay signals to obtain first and second addition signals, respectively; first and second distributors for distributing the first and second addition signals, respectively; first and second multiplication circuits for multiplying distributed signals from the first and second distributors to obtain first and second multiplication signals, respectively; and a data demodulation circuit for demodulating the first and second multiplication signals to obtain a transmission information signal.

In the spread spectrum demodulation circuit compatible with the QPSK scheme, a ratio between levels "1" and "0" of data input to the data demodulation circuit can be theoretically improved to 5.828, and the reliable data reproduction can be performed even if there are external noises.

A spread spectrum communication apparatus according to the present invention comprise a spread spectrum demodulation unit for demodulating a reception signal to which a quadrature phase shift keying and a spread spectrum modulation are performed, wherein the spread spectrum demodulation unit has the same construction as the spread spectrum demodulation circuit described above.

It is therefore possible to realize a spread spectrum communication apparatus using the spread spectrum demodulation circuit described above.

A delay-detection-type demodulation circuit according to the present invention comprises: first and second delay elements for delaying a reception signal, to which a quadrature phase shift keying is performed, to obtain first and second delay signals, respectively; first and second adders for adding the reception signal and the first and second delay signals to obtain first and second addition signals, respectively; first and second distributors for distributing the first and second addition signals, respectively; first and second multiplication circuits for multiplying distributed signals from the first and second distributors to obtain first and second multiplication signals, respectively; and a data demodulation circuit for demodulating the first and second multiplication signals to obtain a transmission information signal.

In the delay-detection-type demodulation circuit compatible with the QPSK scheme, a ratio between levels "1" and "0" of data input to the data demodulation circuit can be theoretically improved to 5.828, and the reliable data reproduction can be performed even if there are external noises.

A delay-detection-type communication apparatus according to the present invention comprises a demodulation unit for demodulating a reception signal to which a quadrature phase shift keying is performed, wherein the demodulation unit has the same construction as the delay-detection-type demodulation circuit described above.

It is therefore possible to realize a delay-detection-type communication apparatus using the delay-detection-type demodulation circuit described above.

BRIEF DESCRIPTION OF THE DRAWINGS

FIG. 3 is a timing chart in which:
(a) shows a transmission information signal;
(b) shows a signal obtained through the differential coding of the transmission information signal;
(c) shows a correlation signal output from a correlation signal generator;
(d) shows a first delay signal delayed in a first delay element;
(e) shows a first addition signal obtained by adding the correlation signal and the first delay signal;
(f) shows an output signal of a first multiplication circuit which multiplies signals obtained by distributing the first addition signal in a first distributor;
(g) shows data reproduced from an output signal of the first multiplication circuit in a first reproduction circuit;
(h) shows a second delay signal delayed in a second delay element;
(i) shows a second addition signal obtained by adding the correlation signal and the second delay signal;
(j) shows an output signal of a second multiplication circuit which multiplies signals obtained by distributing the second addition signal in a second distributor;
(k) shows data reproduced from an output signal of the second multiplication circuit in a second reproduction circuit; and
(l) shows an information signal obtained in a synthesizing circuit by synthesizing the data reproduced by the first and second reproduction circuits.

FIG. 12 is a timing chart in which:

(a) shows a transmission information signal;

(b) shows a signal obtained through the differential coding of the transmission information signal;

(c) shows a correlation signal output from a correlation signal generator;

(d) shows a first delay signal delayed in a first delay element;

(e) shows a first addition signal obtained by adding the correlation signal and the first delay signal;

(f) data reproduced from the first addition signal in a first reproduction circuit;

(g) a second delay signal delayed in a second delay element;

(h) shows a second addition signal obtained by adding the correlation signal and the second delay signal;

(i) shows data reproduced from the second addition signal in a second reproduction circuit;

(j) shows an information signal obtained in a synthesizing circuit by synthesizing the data reproduced in the first and second reproduction circuits; and (k) shows an actual signal waveform.

DETAILED DESCRIPTION OF THE PREFERRED EMBODIMENTS

Embodiments of the present invention will be described with reference to FIGS. 1 to 9.

(First Embodiment)

Figure 1:
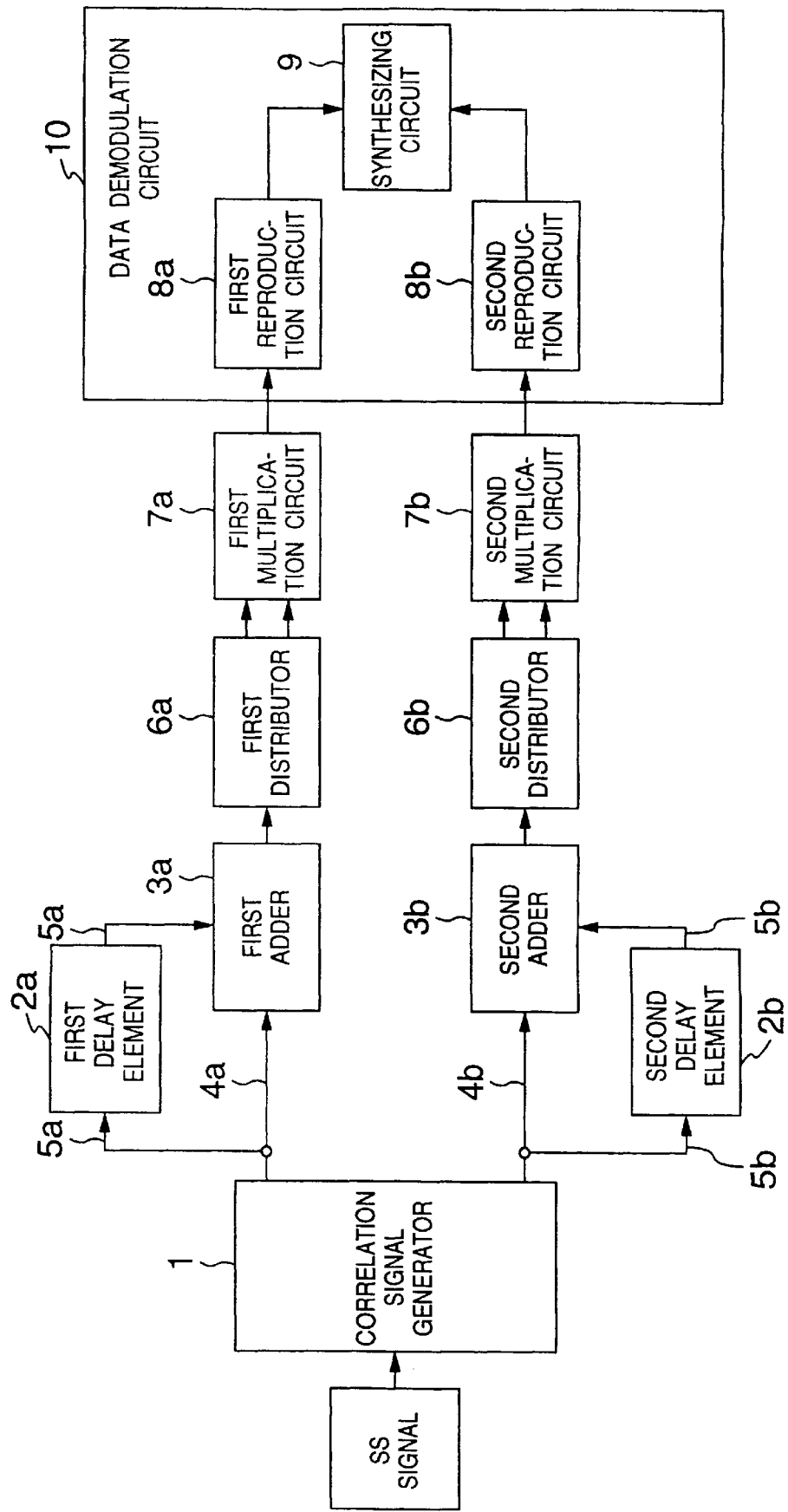
FIG. 1 is a block diagram showing a spread spectrum demodulation circuit according to a first embodiment of the present invention.

FIG. 1 is a block diagram showing a spread spectrum demodulation circuit (SS demodulation circuit) according to the first embodiment of the present invention. The SS demodulation circuit comprises a correlation signal generator 1, a first delay element 2a, a first adder 3a for adding a correlation signal output from the correlation signal generator 1 and an output signal (first delay signal) of the first delay element 2a, signal lines 4a and 5a, a first distributor 6a for distributing an output signal (first addition signal) of the first adder 3a, a first multiplication circuit 7a for multiplying signals distributed in the first distributor 6a, and a first reproduction circuit 8a for reproducing data from an output signal of the first multiplication circuit 7a. For signal inputs to the first adder 3a, the delay amount of the first delay element 2a is set so that the input signal (first delay signal) from the first delay element 2a is delayed from the input signal (correlation signal) from the correlation signal generator 1 by $T+(\pm n+5\times a/8)/fc$, where T represents one period of a reception signal to be demodulated, n represents an integer from "0" to a value equal to or smaller than a ratio multiplied by "2" of a carrier frequency fc of a signal input to a means for retrieving correlation signal to a chip rate, and $1/2 \leq a \leq 3/2$.

The SS demodulation circuit further comprises a second delay element 2b, a second adder 3b for adding the correlation signal output from the correlation signal generator 1 and an output signal (second delay signal) of the second delay element 2b, signal lines 4b and 5b, a second distributor 6b for distributing an output signal (second addition signal) of the second adder 3b, a second multiplication circuit 7b for multiplying signals distributed in the second distributor 6b, a second reproduction circuit 8b for reproducing data from an output signal of the second multiplication circuit 7b, and a synthesizing circuit 9 for synthesizing output data from the first and second reproduction circuits 8a and 8b. A data demodulation circuit 10 is constituted of the first and second reproduction circuits 8a and 8b and the synthesizing circuit 9. For signal inputs to the second adder 3b, the delay amount of the second delay element 2b is set so that the input signal (second delay signal) from the second delay element 2b is delayed from the input signal (correlation signal) from the correlation signal generator 1 by $T+(\pm m-5\times a/8)/fc$. It is preferable that n=0, m=0, and a=1.

Figure 2:
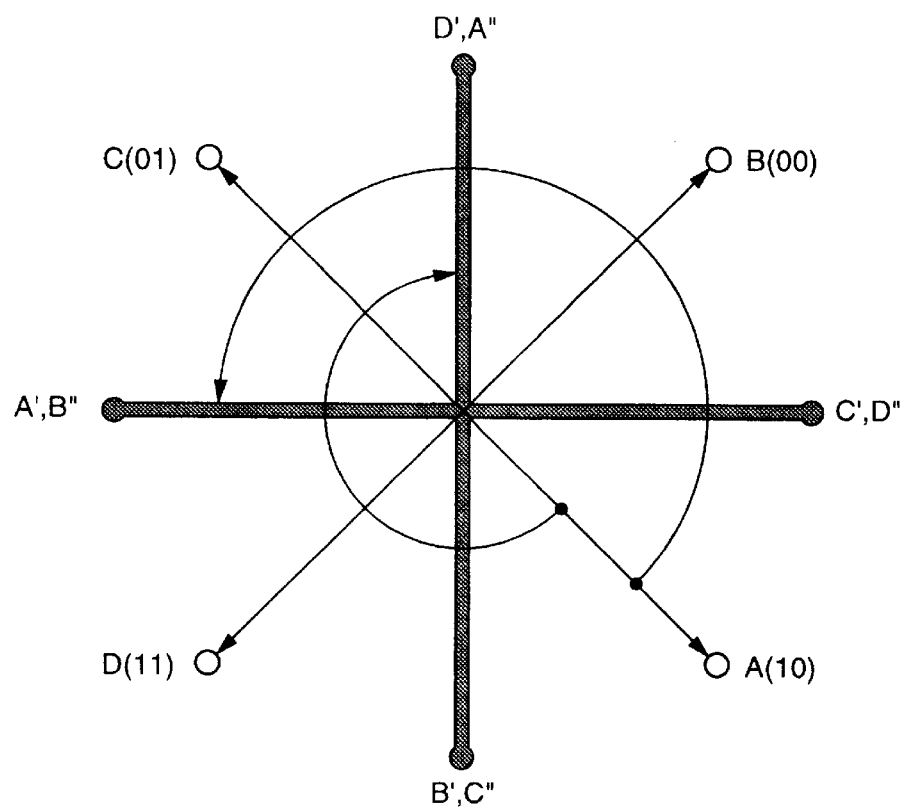
FIG. 2 is a phase transition diagram showing the phase states of a surface acoustic wave matched filer and delay elements during demodulation a signal compatible with a QPSK scheme.

FIG. 2 is a phase transition diagram showing the phase states of a surface acoustic wave matched filer and delay elements during demodulation of a signal compatible with the QPSK scheme. In FIG. 2, (A, B, C, D) indicates four phase states, i.e. A(10), B(00), C(01) and D(11), corresponding to the QPSK scheme in the output signal of the surface acoustic wave matched filter. Assuming that a=1, (A', B', C', D') indicates the phase states of the signal delayed in the first delay element 2a by $T+(\pm n+5/8)/fc$, and (A", B", C", D") indicates the phase states of the signal delayed in the second delay element 2b by $T+(\pm m-5/8)/fc$. For example, when the signal in the state A is delayed in the first delay element 2a by $T+(\pm n+5/8)/fc$, the state A transits to the state A'. When the signal in the state A is delayed in the second delay element 2b by $T+(\pm m-5/8)/fc$, the state A transits to the state A".

In FIG. 3, (a) illustrates a timing of an information signal to be transmitted (transmission information signal) D1; (b) illustrates a timing of a signal D2 which is obtained through the differential coding of the transmission information signal D1; (c) illustrates a timing of a correlation signal S1 output from the correlation signal generator 1; (d) illustrates a timing of a first delay signal S2 delayed in the first delay element 2a by $T+(\pm n+5/8)/fc$; (e) illustrates a timing of a first addition signal S3 obtained by adding the correlation signal S1 and the first delay signal S2; (f) illustrates a timing of an output signal (first multiplication signal) S4 of the first multiplication circuit 7a which multiplies signals obtained by distributing the first addition signal S3 in the first distributor 6a; (g) illustrates a timing of data D3 reproduced from an output signal S4 of the first multiplication circuit 7a in the first reproduction circuit 8a; (h) illustrates a timing of a second delay signal S5 delayed in the second delay element 2b by $T+(\pm m-5/8)/fc$; (i) illustrates a timing of a second addition signal S6 obtained by adding the correlation signal S1 and the second delay signal 5; (j) illustrates a timing of an output signal (second multiplication signal) S7 of a second multiplication circuit 7b which multiplies signals obtained by distributing the second addition signal S6 in the second distributor 6b; (k) illustrates a timing of data D4 reproduced from an output signal S7 of the second multiplication circuit 7b in the second reproduction circuit 8b; (l) illustrates a timing of an information signal D5 obtained in the synthesizing circuit 9 by synthesizing the data reproduced in the first and second reproduction circuits 8a and 8b.

Next, the operation of the SS demodulation circuit shown in FIG. 1 will be described with reference to FIGS. 2 and 3. It is assumed that the differential coding of the transmission information signal D1 (see (a) in FIG. 3) is performed in the transmitter. When the differential coding (DD2(i)=DD1(i)+DD2(i-1)) of the transmission information signal D1 (10000111011110: repetitive data of transmission information ABCDCDA) is performed, the transmission information signal D1 is changed to the signal D2 (10100011100100: AABDACB) (see (b) in FIG. 3). Therefore, in the SS demodulation circuit shown in FIG. 1, the output signal (correlation signal) of the correlation signal generator 1 has an output waveform S1 with the phase information corresponding to the differential-coded information (see (c) in FIG. 3). In the first adder 3a, the correlation signal S1 and the output signal (first delay signal) S2 having the phase information (B'A'A'B'D'A'C') delayed in the first delay element 2a by T+(±n+5/8)/fc (see (d) in FIG. 3) are added to thereby obtain the first addition signal S3 (see (e) in FIG. 3). Because the waveform of the first addition signal S3 has a large addition waveform when the signal with the phase information A is added to the output waveform having the phase difference of ±45 degrees such as B' or C', whereas it has a small addition waveform when the signal with the phase information A is added to the output waveform having the phase difference of ±225 degrees such as A' or D'. The levels of the large and small addition waveforms of the first addition signal S3 are 1.846 and 0.765 if the levels of the input signals S1 and S2 are assumed to be "1", and the ratio between the levels of the large and small addition waveforms is about 2.413 (=1.8460/765). The first addition signal S3 constituted of the large and small addition waveforms is distributed in the first distributor 6a. The distributed signals are multiplied in the first multiplication circuit 7a to thereby obtain the first multiplication signal S4 (see (f) in FIG. 3). In the first multiplication signal S4, the ratio between the levels of the large and small multiplication waveforms becomes about 5.828 (=1.846$^2$/0.765$^2$). In the second adder 3b, the correlation signal S1 and the output signal (second delay signal) S5 with the phase information (B"A"A"B"D"A"C") delayed in the second delay element 2b by T+(±m−5/8)/fc (see (h) in FIG. 3) are added to thereby obtain the second addition signal S6 (see (i) in FIG. 3). Because the waveform of the second addition signal S6 has a large addition waveform when the signal with the phase information A is added to an output waveform having the phase difference of ±45 degrees such as C" or D", whereas it has a small addition waveform when the signal with the phase information A is added to an output waveform having the phase difference of ±225 degrees such as A" or B". The levels of the large and small addition waveforms of the second addition signal S6 are 1.846 and 0.765 if the levels of the input signals S1 and S5 are assumed to be "1", and the ratio between the levels of the large and small addition waveforms is about 2.413. The second addition signal S6 constituted of the large and small addition waveforms is distributed in the second distributor 6b. The distributed signals are multiplied in the second multiplication circuit 7b to thereby obtain the second multiplication signal S7 (see (j) in FIG. 3). In the second multiplication signal S7, the ratio between levels of the large and small multiplication waveforms becomes about 5.828. Clocks are generated from the waveforms of the first and second multiplication signals S4 and S7. Further, in the first and second reproduction circuits 8a and 8b, the data D3 and D4 are reproduced by setting the output waveforms S4 and S7 having the large level to "1" and those having the small level to "0". In the synthesizing circuit 9, the data D4 and D7 are synthesized to thereby obtain the demodulated data D5 (10000111011110) (see (l) in FIG. 3). In the above manner, the signal compatible with the QPSK scheme can be demodulated and the original data D1 can be recovered. That is, the difference of the delay amount between the first and second delay elements 2a and 2b is (T+(±n+5/8)/fc)−(T+(±m−5/8)/fc)=(±(n+m)+1)/fc+(1/4)/fc, and therefore the demodulation for the QPSK scheme can be performed. Because the first term of the right side is 2π in terms of phase, so that the phase difference becomes 90 degrees only under consideration of the second term.

Figure 4:
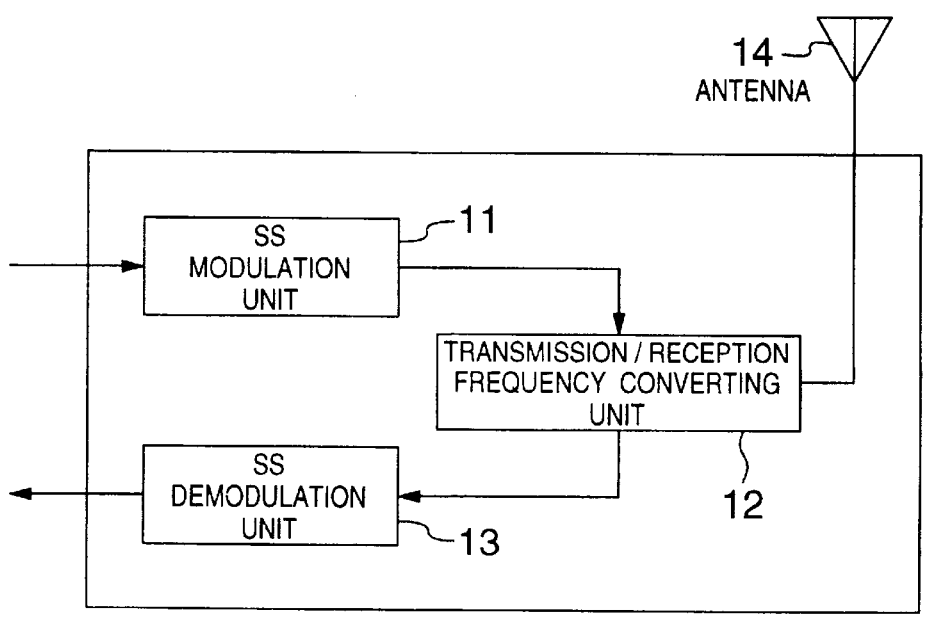
FIG. 4 is a block diagram of an SS communication apparatus using the SS demodulation circuit shown in FIG. 1.

FIG. 4 is a block diagram of an SS communication apparatus using the SS demodulation circuit shown in FIG. 1. The SS communication apparatus comprises an SS modulation unit 11 for converting data to be transmitted into an SS signal by using a predetermined code sequence, a transmission/reception frequency converting unit 12 for converting the frequency of the SS signal to and from that of the transmission/reception signal, an SS demodulation unit 13 for demodulating a spread spectrum communication signal to recover the transmitted original data, and an antenna 14 for transmitting/receiving a signal. The SS demodulation circuit shown in FIG. 1 is used as the SS demodulation unit 13.

In the above explanation, although the structure of one transceiver using one transmission/reception frequency converting unit is used, the embodiment is not limited to only this circuit structure. For example, it is obvious that the frequency converting unit may be divided into circuit portions respectively for transmission and reception, or a transmitter and a receiver may be separated by providing the receiver with the SS demodulation unit, without posing any practical problem.

In the present embodiment, the transmission information is subjected to the differential coding, transmitted and then demodulated. The transmission information D1 itself may be transmitted, and the demodulation information D5 obtained by the SS modulation unit 13 is subjected to the differential coding to obtain information same as the information D1. As the delay element, a surface acoustic wave delay line or an electronic circuit such as a shift register may be used similar to conventional techniques. An important point is the delay amount of signals input to the first and second adders 3a and 3b, and the type of delay element is not specifically limited. In the above embodiment, although one correlation signal generator 1 is used, the correlation signal generator may be provided at each of the delay elements. Further, an amplifier may be provided before or after the delay element, depending on the selection of the delay element.

In the present embodiment, the multiplication circuit output signals obtained by multiplying the distributed signals, which are obtained by distributing the first and second addition signals obtained in the first and second adders 3a and 3b, to the first and second multiplication circuits 7a and 7b are supplied to the data demodulation circuit 10. Accordingly, the ratio of the output levels of the first and second multiplication circuits 7a and 7b corresponding to the data "1" and "0" can be improved from 2.413 to 5.828. It is therefore possible to realize a spread spectrum demodulation circuit compatible with the QPSK scheme in which the reliable data reproduction can be performed even if there are external noises, and a spread spectrum communication apparatus using the spread spectrum demodulation circuit.

(Second Embodiment)

Figure 5:
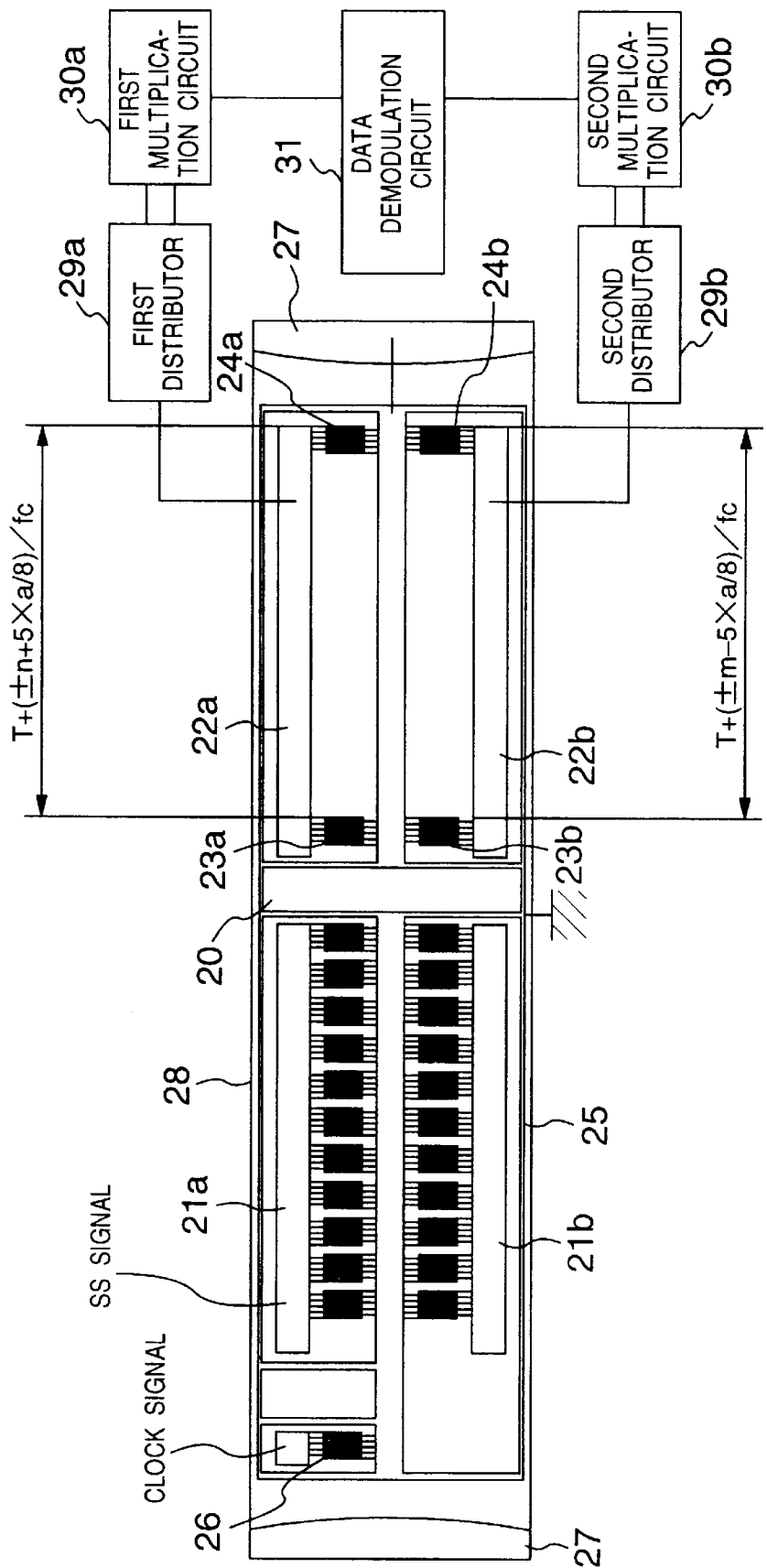
FIG. 5 is a schematic diagram showing a spread spectrum demodulation circuit in which the correlation signal generator, delay elements, and adders described with reference to the first embodiment are realized by using a surface acoustic wave element.

FIG. 5 shows a spread spectrum demodulation circuit in which the correlation signal generator, delay elements, and adders described with the first embodiment are realized by using a surface acoustic wave element. In FIG. 5, reference numeral 20 represents a piezoelectric quartz substrate having a mirror surface. A first signal input coding electrode 21a is formed on the quartz substrate 20 by photolithography, and is made of material having a small electrical resistivity such as Al or Au. A first output electrode 22a has first and second output comb-shaped electrodes 23a and 24a which are connected in parallel. The first output comb-shaped electrode 23a is formed so as to be spaced apart from the first signal input coding electrode 21a by a predetermined distance. The second output comb-shaped electrode 24a is spaced apart from the first output comb electrode 23a by a distance corresponding to T+(±n+5×a/8)/fc, where T represents one period of a reception signal to be demodulated, n represents an integer from "0" to a value equal to or smaller than a ratio multiplied by "2" of a carrier frequency fc of a signal input to a surface acoustic wave matched filter to a chip rate, and $1/2 \leq a \leq 3/2$. The second output comb-shaped electrode 24a has the same polarity as that of the first output comb-shaped electrode 23a. A second signal input coding electrode 21b is formed on the quartz substrate 20 by photolithography, and is made of material having a small electrical resistivity such as Al or Au. A second output electrode 22b has third and fourth output comb-shaped electrodes 23b and 24b which are connected in parallel. The third output comb-shaped electrode 23b is formed so as to be spaced apart from the second signal input coding electrode 21b by a predetermined distance. The fourth output comb-shaped electrode 24b is spaced apart from the third output comb-shaped electrode 23b by a distance corresponding to $T+(\pm m-5 \times a/8)/fc$, where T represents one period of a reception signal to be demodulated, m represents an integer from "0" to a value equal to or smaller than a ratio multiplied by "2" of the carrier frequency fc of a signal input to a surface acoustic wave matched filter to a chip rate, and $1/2 \leq a \leq 3/2$. The fourth output comb-shaped electrode 24b has the same polarity as that of the third output comb-shaped electrode 23b. An earth pattern 25 is formed so as to surround the input and output electrodes, and is provided for reducing electromagnetic induction noises. A clock signal output comb-shaped electrode 26 is spaced apart from the first signal input coding electrode 21a by a predetermined distance. Sound absorbing materials 27 are formed at the outside of the input/output electrodes 21b, 22a, 22b and 26 in order to absorb unnecessary surface acoustic waves. A surface acoustic wave element 28 has the constituent elements 20, 21a, 21b, 22a, 22b, 25, 26 and 27. A first distributor 29a distributes an output signal of the first output electrode 22a. A first multiplication circuit 30a multiplies the signals distributed in the first distributor 29a. A second distributor 29b distributes an output signal of the second output electrode 22b. A second multiplication circuit 30b multiplies the signals distributed in the second distributor 29b. A data demodulation circuit 31 demodulates the output signals of the first and second multiplication circuits 30a and 30b to recover data.

The surface acoustic wave element shown in FIG. 5 corresponds to the SS demodulation unit 13 shown in FIG. 4 (i.e. the SS demodulation circuit shown in FIG. 1), so that it has the same operation and effects as those of the SS demodulation circuit shown in FIG. 1. However, in the present embodiment, it is different in that the clock signal output comb electrode 26 is provided so that a stable clock signal can be obtained.

Similar to the first embodiment, it is possible to improve the conversion efficiency or output efficiency by setting the number of comb-shaped electrode pairs of the signal input coding electrodes 21a and 21b, which corresponds to code series, to more than one pair and equal to or smaller than the ratio between the carrier frequency and the chip rate. The structures of the input and output electrodes may be reversed, that is, the input electrodes use the comb electrodes and the output electrodes use the coding electrodes. In the present embodiment, although the clock signal output comb-shaped electrode 26 is formed on the opposite side of the output comb-shaped electrodes 22a and 22b in regard to the input coding electrodes 21a and 21b. However, the position and size of the clock signal output comb-shaped electrode 26 are not limited thereto. For example, the clock signal output comb-shaped electrode 26 may be formed between the signal input coding electrode 21a and output comb-shaped electrode 22a.

The shape of the sound absorbing material 27 shown in FIG. 5 is only illustrative and is not limited only thereto so long as the shape ensures good characteristics. The sound absorbing material 27 may be omitted depending upon the amount of unnecessary surface acoustic waves. In the present embodiment, normal type electrodes are used for the surface acoustic wave matched filter and surface acoustic wave delay lines. However, the electrode shape may be a double electrode shape or a weighted shape, if necessary for the suppression of reflection by electrodes and for the bandwidth limit. Particularly in the present embodiment in which three or more electrodes are formed along the progression direction of surface acoustic waves, the double electrode structure of each electrode can suppress unnecessary radiation considerably and stabilize the output signal.

Although quartz is used as the material of the piezoelectric substrate, it is obvious that other materials providing a similar performance may be used.

In the present embodiment, the functions of the adders are realized by forming the output electrodes 22a and 22b by connecting the first and second output comb-shaped electrodes 23a and 24a in parallel and the third and fourth output comb-shaped electrodes 23b and 24b in parallel. If the adders are externally provided, it is apparent that neither the output comb-shaped electrodes 23a and 24a nor the output comb-shaped electrodes 23b and 24b are connected in parallel, and the output signals from the output comb-shaped electrodes 23a, 24a, 23b and 24b are separately supplied to the external adders to obtain the addition signals.

As mentioned above, in the present embodiment, the demodulation compatible with the QPSK scheme can be performed without providing external adders, and the surface acoustic wave element can be made compact. It is therefore possible to configure the simple and compact spread spectrum demodulation circuit compatible with the QPSK scheme.

(Third Embodiment)

Figure 6:
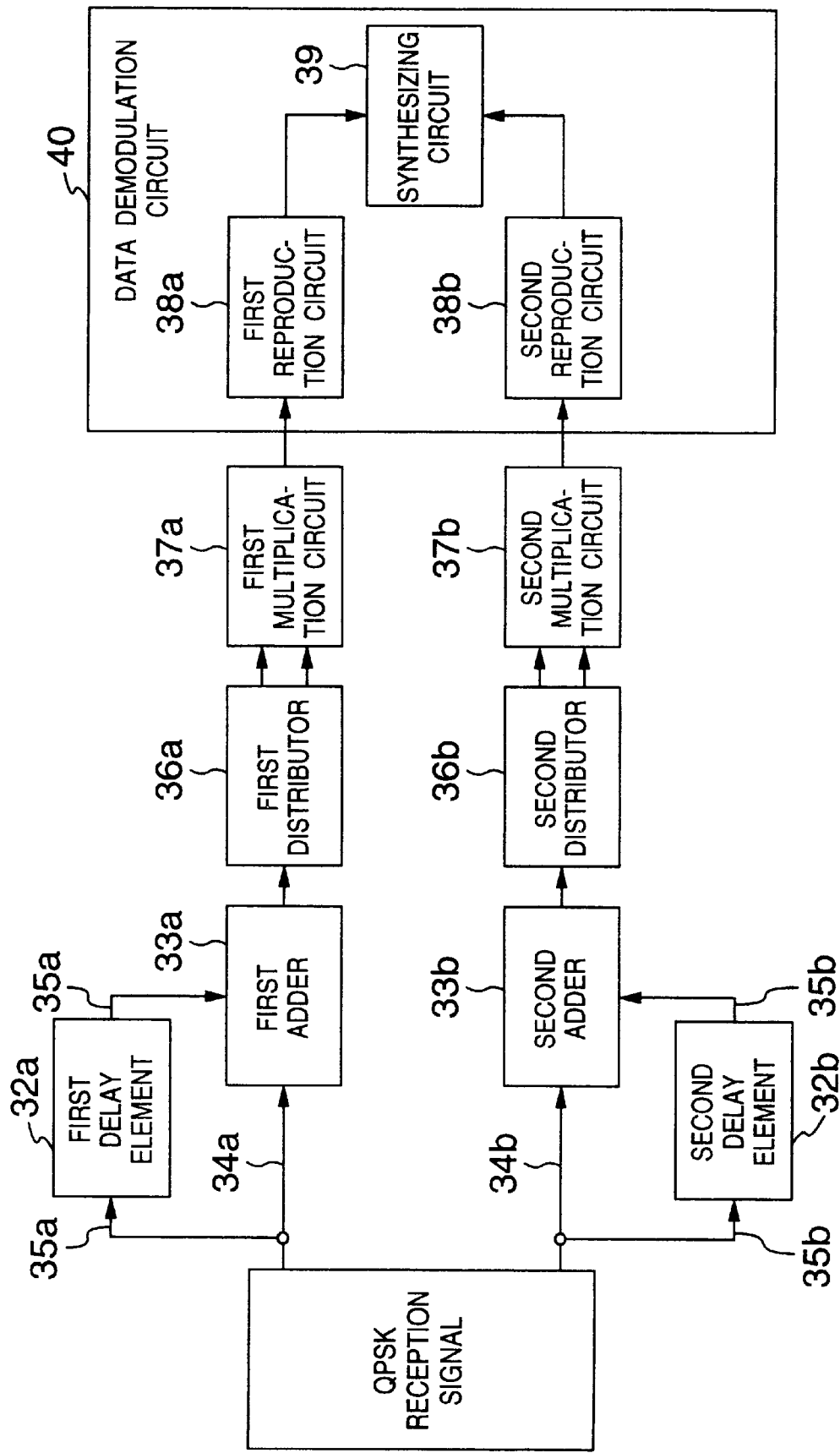
FIG. 6 is a block diagram showing a QPSK demodulation unit as a delay-detection-type demodulation circuit.

FIG. 6 is a block diagram showing a QPSK demodulation unit as a delay-detection-type demodulation circuit. The QPSK demodulation unit comprises a first delay element 32a, a first adder 33a for adding a QPSK reception signal and an output signal (first delay signal) of the first delay element 32a, signal lines 34a and 35a, a first distributor 36a for distributing an output signal (first addition signal) of the first adder 33a, a first multiplication circuit 37a for multiplying signals distributed by the first distributor 36a, and a first reproduction circuit 38a for reproducing data from an output signal (first multiplication signal) of the first multiplication circuit 37a. For signal inputs to the first adder 33a, the delay amount of the first delay element 32a is set so that the input signal (first delay signal) from the first delay element 32a is delayed from the QPSK reception signal by $T+(5 \times a/8)/fc$, where T represents one period of a reception signal to be demodulated, fc represents a carrier frequency, and $1/2 \leq a \leq 3/2$). The QPSK demodulation unit further comprises a second delay element 32b, a second adder 33b for adding the QPSK reception signal and an output signal (second delay signal) of the second delay element 32b, signal lines 34b and 35b, a second distributor 36b for distributing an output signal (second addition signal) of the second adder 33b, a second multiplication circuit 37b for multiplying signals distributed by the second distributor 36b, a second reproduction circuit 38b for reproducing data from an output signal (second multiplication signal) of the second multiplication circuit 37b, and a synthesizing circuit 39 for synthesizing output data of the first reproduction circuit 38a and output data of the second reproduction circuit 38b. A data demodulation circuit 40 is constituted of the first and second reproduction circuits 38a and 38b and the synthesizing circuit 39. For signal inputs to the second adder 33b, the delay amount of the second delay element 32b is set so that the input signal (second delay signal) from the second delay element 32b is delayed from the QPSK reception signal by T+(−5×a/8)/fc. It is preferable that a=1.

Figure 7:
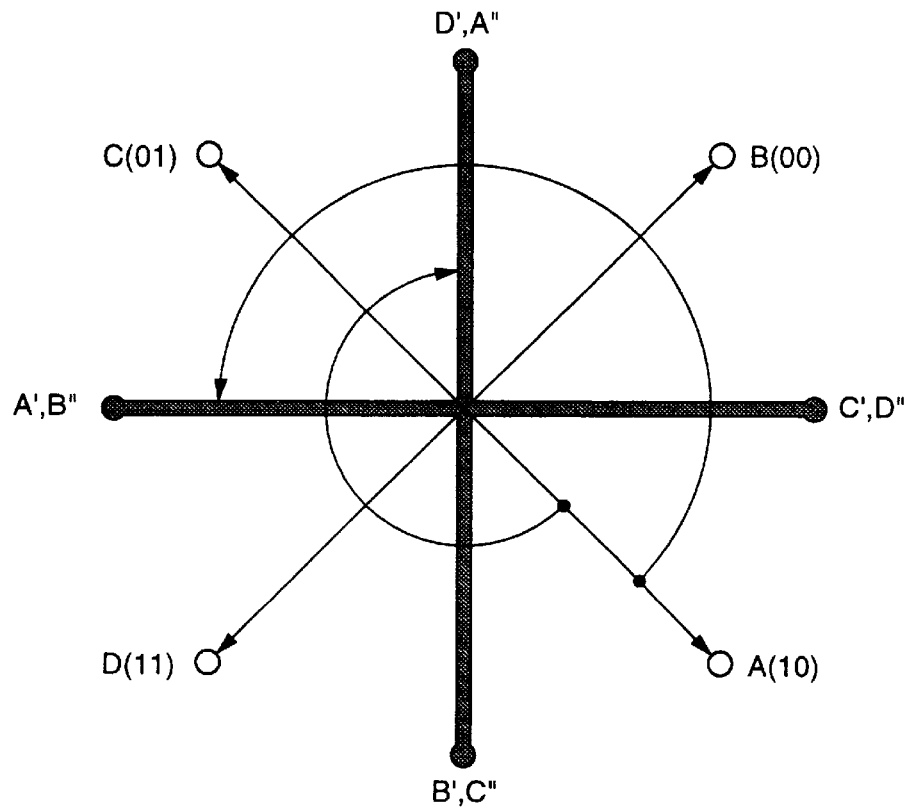
FIG. 7 is a phase transition diagram showing the phase states of a reception signal and delay elements during demodulation a signal compatible with a QPSK scheme.

FIG. 7 is a phase transition diagram showing the phase states of a reception signal and delay elements during demodulation of a signal compatible with the QPSK scheme. In FIG. 7, (A, B, C, D) indicates four phase states, i.e. A(10), B(00), C(01) and D(11), corresponding to the QPSK reception signal. Assuming that a=1, (A', B', C', D') indicates the phase states of the signal delayed in the first delay element 32a by T+(⅝)/fc, and (A", B", C", D") indicates the phase states of the signal delayed in the second delay element 32b by T+(−⅝)/fc. For example, when the signal in the state A is delayed in the first delay element 32a by T+(⅝)/fc, the state A transits to the state A'. When the signal in the state A is delayed in the second delay element 32b by T+(−⅝)/fc, the state A transits to the state A".

Figure 8:
FIG. 8 is a timing chart in which:
(a) shows a transmission information signal;
(b) shows a signal obtained through the differential coding of the transmission information signal;
(c) shows a QPSK reception signal;
(d) shows a first delay signal delayed in a first delay element;
(e) shows a first addition signal output from a first adder which adds the QPSK reception signal and the first delay signal output from the first delay element;
(f) shows a first multiplication signal output from a first multiplication circuit which multiplies signals obtained by distributing the first addition signal in a first distributor;
(g) shows data reproduced from the first multiplication signal of the first multiplication circuit in a first reproduction circuit;
(h) shows a second delay signal delayed in a second delay element;
(i) shows a second addition signal output from a second adder which adds the QPSK reception signal and the second delay signal output from the second delay element;
(j) shows a second multiplication signal output from a second multiplication circuit which multiplies signals obtained by distributing the second addition signal in a second distributor;
(k) shows data reproduced from the second multiplication signal of the second multiplication circuit in a second reproduction circuit; and
(l) shows an information signal obtained in a synthesizing circuit by synthesizing the data reproduced by the first and second reproduction circuits.
Figure 8:
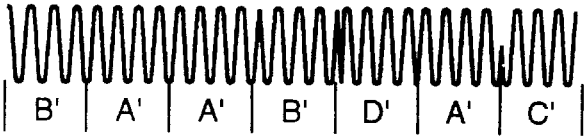
Figure 8:
Figure 8:
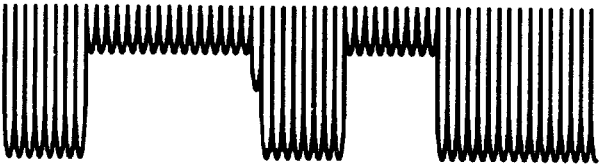
Figure 8:
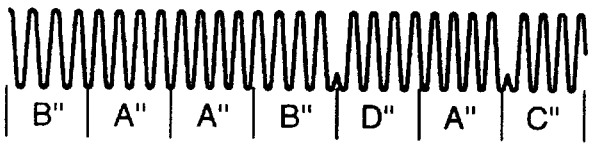
Figure 8:
Figure 8:
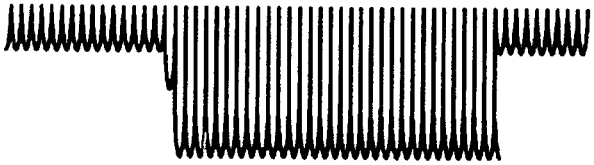
Figure 10:
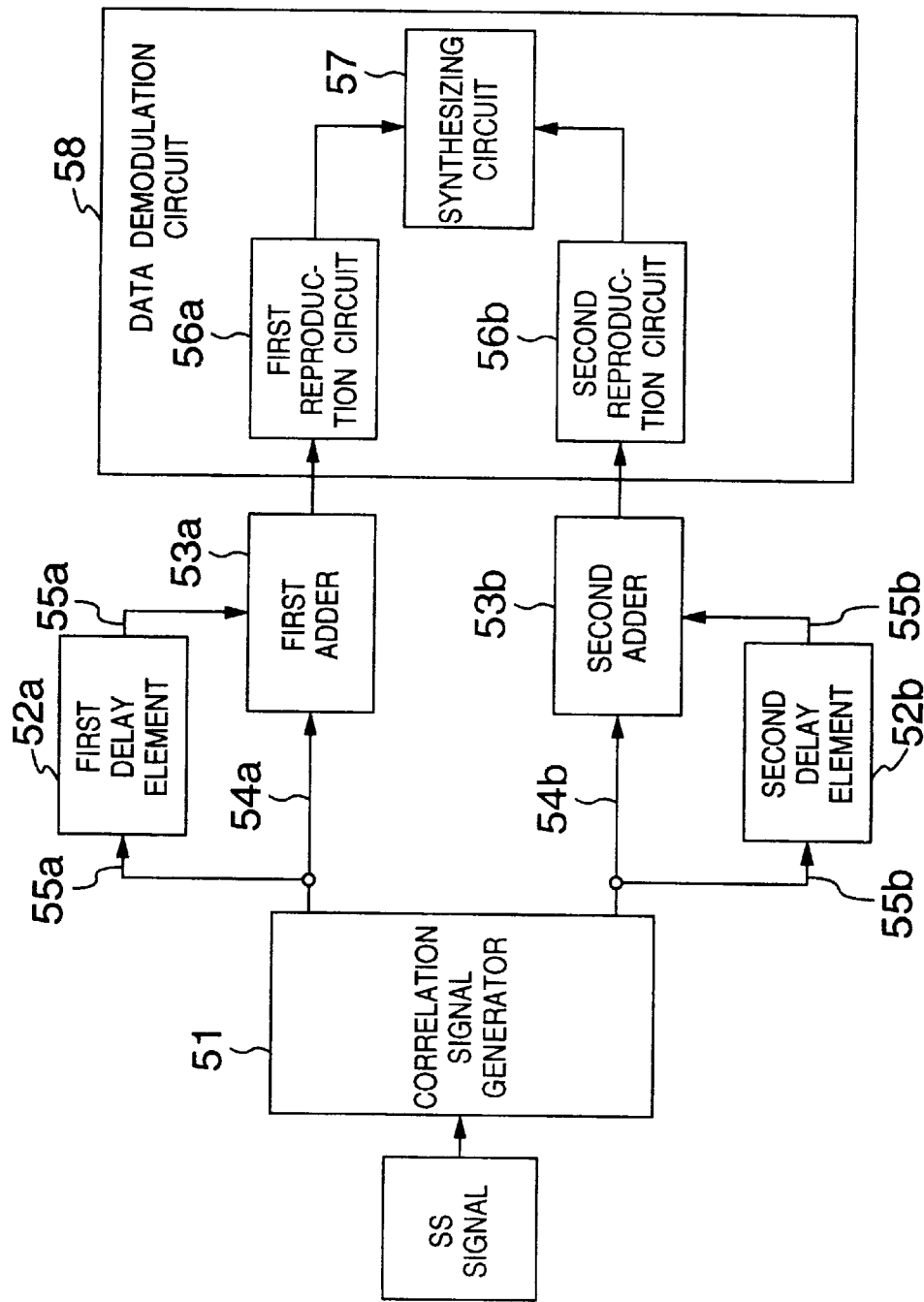
FIG. 10 is a block diagram of a conventional spread spectrum demodulation circuit.
Figure 11:
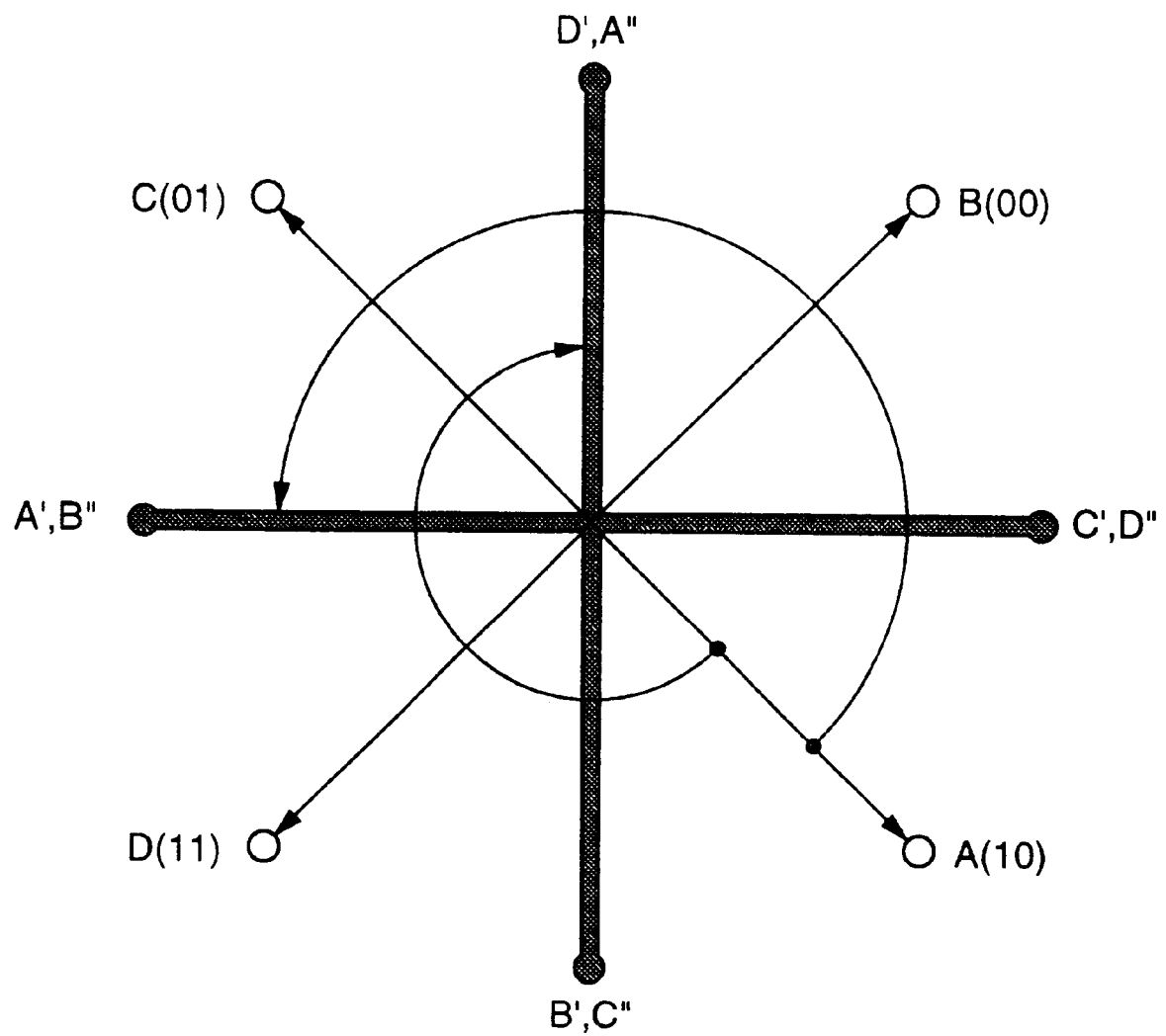
FIG. 11 is a phase transition diagram showing the phase states of a surface acoustic wave matched filer and delay elements during demodulation of a signal compatible with a QPSK scheme.
Figure 12:
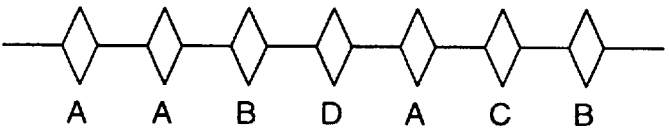
Figure 12:
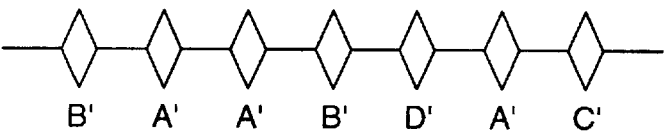
Figure 12:
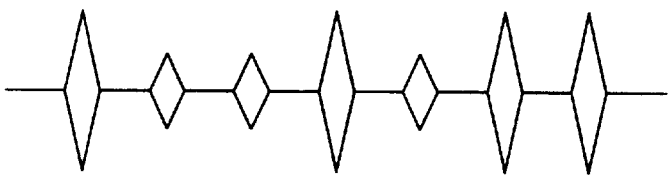
Figure 12:
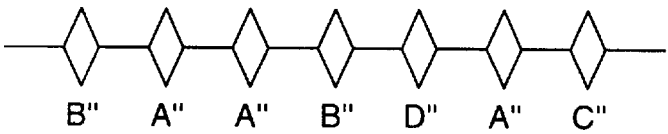
Figure 12:
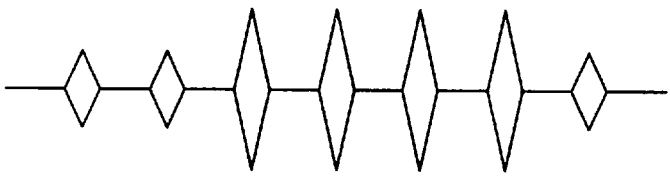
Figure 12:
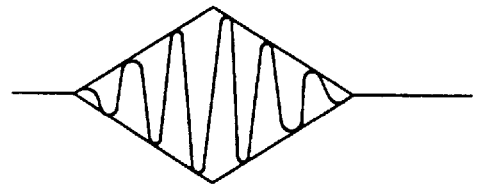

In FIG. 8, (a) illustrates a timing of an information signal to be transmitted (transmission information signal) D11; (b) illustrates a timing of a signal D12 which is obtained through the differential coding of the transmission information signal D11; (c) illustrates a timing of a QPSK reception signal S11; (d) illustrates a timing of a first delay signal S12 delayed in the first delay element 32a by T+(⅝)/fc; (e) illustrates a timing of a first addition signal S13 output from the first adder 33a obtained by adding the QPSK reception signal and the first delay signal output from the first delay element 32a; (f) illustrates a timing of a first multiplication signal S14 output from the first multiplication circuit 37a which multiplies the signals obtained by distributing the first addition signal S13 in the first distributor 36a; (g) illustrates a timing of data D13 reproduced from the first multiplication signal S14 of the first multiplication circuit 37a in the first reproduction circuit 38a; (h) illustrates a timing of a second delay signal S15 delayed in the second delay element 32b by T+(−⅝)/fc; (i) illustrates a timing of a second addition signal S16 output from the second adder 33b obtained by adding the QPSK reception signal and the second delay signal S15 output from the second delay element 32b; (j) illustrates a timing of a second multiplication signal S17 output from the second multiplication circuit 37b which multiplies the signals obtained by distributing the second addition signal from the second adder 33b in the second distributor 36b; (k) illustrates a timing of data D14 reproduced from the second multiplication signal S17 of the second multiplication circuit 37b in the second reproduction circuit 38b; (l) illustrates a timing of an information signal D15 obtained in the synthesizing circuit 39 by synthesizing the data reproduced in the first and second reproduction circuits 38a and 38b. As seen from the information signal D15 (see (l) in FIG. 8), it is recovers the same data as the original data in the delay-detection-type demodulation circuit.

Next, the operation of the delay-detection-type demodulation circuit shown in FIG. 6 will be described with reference to FIGS. 7 and 8. In the following, it is assumed that the differential coding of the transmission information signal D11 is performed in the transmitter. When the differential coding (DD2(i)=DD1(i)+DD2(i−1)) of the transmission information signal D11 (10000111011110: repetitive data of transmission information ABCDCDA) is reformed, the transmission information signal D11 is changed to the signal D12 (10100011100100: AABDACB). Therefore, the QPSK reception signal has an waveform S11 with the phase information corresponding to the differential-coded information (see (c) in FIG. 8). In the first adder 33a, the QPSK reception signal S11 and the output signal (first delay signal) S12 (see (d) in FIG. 8) having the phase information (B'A'A'B'D'A'C') delayed in the first delay element 32a by T+(⅝)/fc are added to thereby obtain the first addition signal S13 (see (e) in FIG. 8). Because the waveform of the first addition signal has a large addition waveform when the signal with the phase information A is added to an output waveform having the phase difference of ±45 degrees such as B' or C', whereas it has a small addition waveform when the signal with the phase information A is added to an output waveform having the phase difference of ±225 degrees such as A' or D'. The levels of the large and small addition waveforms of the first addition signal S13 are 1.846 and 0.765 if the levels of the input signals S11 and S12 are assumed "1", and the ratio between the levels of the large and small addition waveforms is about 2.413. The first addition signal S13 constituted of the large and small addition waveforms is distributed in the first distributor 36a, and then the distributed signals are multiplied in the first multiplication circuit 37a to thereby obtain the first multiplication signal S14 (see (f) in FIG. 8). In the first multiplication signal S14, the ratio of between the levels of the large and small multiplication waveforms becomes about 5.828. The QPSK reception signal S11 and the output signal (second delay signal) S15 having the phase information (B"A"A"B"D"A"C") delayed in the second delay element 32b by T+(−⅝)/fc (see (h) in FIG. 8) are added in the second adder 33b to thereby obtain the second addition signal S16 (see (i) in FIG. 8). Because the waveform of the second addition signal has a large addition waveform when the signal with the phase information A is added to an output waveform having the phase difference of ±45 degrees such as C" or D", whereas it has a small addition waveform when the signal with the phase information A is added to an output waveform having the phase difference of ±225 degrees such as A" or B". The levels of the large and small addition waveforms S16 are 1.846 and 0.765, and the ratio between the levels of the large and small addition waveforms is about 2.413. The second addition signal S16 constituted of the large and small addition waveforms is distributed in the second distributor 36b, and then the distributed signals are multiplied in the second multiplication circuit 37b to thereby obtain the second multiplication signal S17 (see (j) in FIG. 8). In the second multiplication signal S17, the ratio between the levels of the large and small multiplication waveforms becomes about 5.828. Clocks are generated from the waveforms of the first and second multiplication signals S14 and S17. In the first and second reproduction circuits 38a and 38b, the data D13 and D14 (see (g) and (k) in FIG. 8) are produced by setting the output waveforms S14 and S17 having the large level to "1" and those having the small level to "0". In the synthesizing circuit 39, the data D14 and D17 is synthesized to thereby obtain the demodulated data D15 (10000111011110) (see (l) in FIG. 8). In the above manner, the signal (QPSK reception signal) S11 compatible with the QPSK scheme can be demodulated and the original data D11 can be recovered. That is, the difference of the delay amount between the first and second delay elements 32a and 32b is (T+(⅝)/fc)−(T+(−⅝)/fc)=1/fc+(¼)/fc, and therefore the demodulation for the QPSK scheme can be performed. Because the first term of the right side is 2 (in terms of phase, so that the phase difference becomes 90 degrees only under consideration of the second term.

Figure 9:
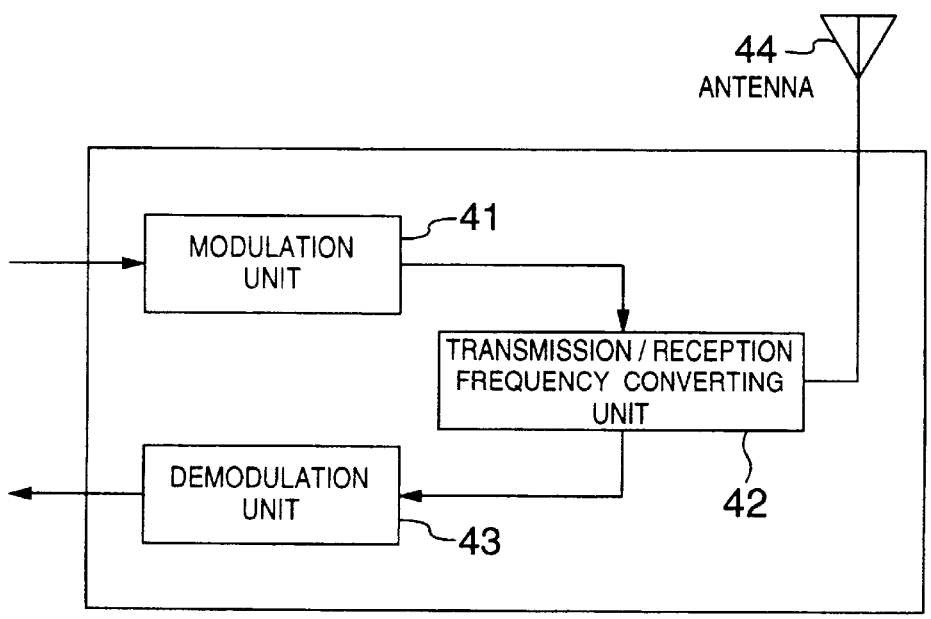
FIG. 9 is a block diagram of a quadrature-phase-shift-keying communication apparatus as a delay-detection-type communication apparatus.

FIG. 9 is a block diagram of a quadrature-phase-shift-keying communication apparatus as a delay-detection-type communication apparatus. The quadrature-phase-shift-keying communication apparatus comprises a modulation unit 41 for modulating data to be transmitted into a signal compatible with the QPSK scheme, a transmission/reception frequency converting unit 42 for converting the frequency of the QPSK signal to and from that of the transmission/reception signal, a demodulation unit for demodulating the QPSK signal to recover the transmitted original data, and an antenna 44 for transmitting/receiving a signal. The delay-detection-type demodulation circuit shown in FIG. 6 is used as the demodulation unit 43.

In the above explanation, although the structure of one transceiver using one transmission/reception frequency converting unit is used, the embodiment is not limited to only this circuit structure. For example, it is obvious that the frequency converting unit may be divided into circuit portions respectively for transmission and reception, or a transmitter and a receiver may be separated by providing the receiver with the QPSK demodulation unit, without posing any practical problem.

In the present embodiment, the transmission information signal D11 is subjected to the differential coding, transmitted and then demodulated. The transmission information signal D11 itself may be transmitted, and the demodulation information signal D11 obtained in the modulation unit 43 is subjected to the differential coding to obtain information same as the transmission information signal D11. As the delay element, a surface acoustic wave delay line or an electronic circuit such as a shift register may be used similar to conventional techniques. An important point is the delay amount of signals input to the first and second adders 33$a$ and 33$b$, and the type of the delay element is not specifically limited.

In the present embodiment, the first and second addition signals S13 and S16 of the first and second adders 33$a$ and 33$b$ are distributed and then input to the first and second multiplication circuits 37$a$ and 37$b$ to obtain the first and second multiplication signals S14 and S17 which are supplied to the data demodulation circuit 40. Accordingly, the ratio of the output levels of the first and second multiplication circuits 37$a$ and 37$b$ corresponding to the data "1" and "0" can be improved from 2.413 to 5.828. It is therefore possible to realize a delay-detection-type demodulation circuit compatible with the QPSK scheme in which the reliable data reproduction can be performed even if there are external noises.

As described so far, the spread spectrum demodulation circuit of the present invention comprises: a correlation signal generator for generating a correlation signal from a reception signal to which a quadrature phase shift keying and a spread spectrum modulation are performed; first and second delay elements having different delay times for delaying the correlation signal to obtain first and second delay signals, respectively; first and second adders for obtaining first and second addition signals by adding the correlation signal and the first and second delay signals, respectively; first and second distributors for distributing the first and second addition signals, respectively; first and second multiplication circuits for multiplying distributed signals from the first and second distributors to obtain first and second multiplication signals, respectively; and a data demodulation circuit for demodulating the first and second multiplication signals to obtain a transmission information signal. It is therefore possible to theoretically set the ratio between levels "1" and "0" to 5.828 by using the distributors and multiplication circuits. Accordingly, the ratio between levels "1" and "0" of data input to the data demodulation circuit can be theoretically improved to 5.828 and the reliable data reproduction for the QPSK scheme is possible even if there are external noises.

According to the present invention, the correlation signal generator is part of a surface acoustic wave matched filter so that it is possible to form a low power consumption correlation signal generator with ease.

According to the present invention, the first delay element has a delay amount (D1) of $T+(\pm n+5\times a/8)/fc$ and the second delay element has a delay amount (D2) of $T+(\pm m-5\times a/8)/fc$, where T represents one period of a reception signal to be demodulated, n and m represent an integer from "0" to a value equal to or smaller than a ratio multiplied by "2" of a carrier frequency fc of a signal input to a means for retrieving correlation signal to a chip rate, and $1/2 \leq a \leq 3/2$. If it is set that n=0, m=0, and a=1, the proper addition signals can be obtained so that the ratio between levels "1" and "0" of data input to the data demodulation circuit can be theoretically improved to 5.828.

According to the present invention, the first and second delay elements are surface acoustic wave delay lines, so that the first and second delay elements of low power consumption can be formed with ease.

A spread spectrum communication apparatus of the present invention has a spread spectrum demodulator for demodulating a reception signal to which a quadrature phase shift keying and a spread spectrum modulation are performed. With this spread spectrum demodulator, the ratio between levels "1" and "0" can be theoretically set to 5.828 by using the distributors and multiplication circuits. Accordingly, the ratio between levels "1" and "0" of data input to the data demodulation circuit can be theoretically improved to 5.828, and a spread spectrum communication apparatus compatible with the QPSK scheme can be realized easily in which the reliable data reproduction can be performed even if there are external noises.

A delay-detection-type demodulation circuit of the present invention comprises: first and second delay elements for delaying a reception signal, to which a quadrature phase shift keying is performed, to obtain first and second delay signals, respectively; first and second adders for adding the reception signal and the first and second delay signals to obtain first and second addition signals, respectively; first and second distributors for distributing the first and second addition signals, respectively; first and second multiplication circuits for inputting distributed signals from the first and second distributors to obtain first and second multiplication signals, respectively; and a data demodulation circuit for demodulating the first and second multiplication signals to obtain a transmission information signal. It is therefore possible to theoretically set the ratio between levels "1" and "0" to 5.828 by using the distributors and multiplication circuits. Accordingly, the ratio between levels "1" and "0" of data input to the data demodulation circuit can be theoretically improved to 5.828 and the reliable data reproduction for the QPSK scheme can be performed even if there are external noises.

According to the present invention, the first delay element has a delay amount (D1') of $T+(5\times a/8)/fc$ and the second delay element has a delay amount (D2') of $T+(-5\times a/8)/fc$, where T represents one period of a reception signal to be demodulated, fc represents a carrier frequency, and $1/2 \leq a \leq 3/2$. If it is set that a=1, the proper addition signals can be obtained so that the ratio between levels "1" and "0" of data input to the data demodulation circuit can be theoretically improved to 5.828.

According to the present invention, the first and second delay elements are surface acoustic wave delay lines, so that the first and second delay elements of low power consumption can be formed with ease.

A delay-detection-type communication apparatus of the present invention has a demodulation unit for demodulating a reception signal to which a quadrature phase shift keying is performed. With the demodulation unit, the ratio between levels "1" and "0" can be theoretically set to 5.828 by using the distributors and multiplication circuits. Accordingly, the ratio between levels "1" and "0" of data input to the data demodulation circuit can be theoretically improved to 5.828, and the delay-detection-type communication apparatus compatible with the QPSK scheme can be realized easily in which the reliable data reproduction can be performed even if there are external noises.

What is claimed is:

1. A spread spectrum demodulation circuit comprising:

a correlation signal generator for generating a correlation signal from a reception signal to which a quadrature phase shift keying and a spread spectrum modulation are performed;

first and second delay elements having different delay times for delaying said correlation signal to obtain first and second delay signals, respectively;

first and second adders for adding said correlation signal and said first and second delay signals to obtain first and second addition signals, respectively;

first and second distributors for distributing said first and second addition signals, respectively;

first and second multiplication circuits for multiplying distributed signals input from said first and second distributors to obtain first and second multiplication signals, respectively; and a data demodulation circuit for demodulating said first and second multiplication signals to obtain a transmission information signal.

2. A spread spectrum demodulation circuit according to claim 1, wherein said correlation signal generator is a part of a surface acoustic wave matched filter.

3. A spread spectrum demodulation circuit according to claim 1, wherein said first delay element has delay amount (D1) of $T+(\pm n+5 \times a/8)/fc$; and said second delay element has delay amount (D2) of $T+(\pm m-5 \times a/8)/fc$, where T represents one period of a reception signal to be demodulated, n and m represent an integer from "0" to a value equal to or smaller than a ratio multiplied by "2" of a carrier frequency fc of a signal input to a means for retrieving a correlation signal to a chip rate, and $1/2 \leq a \leq 3/2$.

4. A spread spectrum demodulation circuit according to claim 2, wherein said first delay element has delay amount (D1) of $T+(\pm n+5 \times a/8)/fc$; and said second delay element has delay amount (D2) of $T+(\pm m-5 \times a/8)/fc$, where T represents one period of a reception signal to be demodulated, n and m represent an integer from "0" to a value equal to or smaller than a ratio multiplied by "2" of a carrier frequency fc of a signal input to a means for retrieving a correlation signal to a chip rate, and $1/2 \leq a \leq 3/2$.

5. A spread spectrum demodulation circuit according to claim 1, wherein said first and second delay elements are surface acoustic wave delay lines.

6. A spread spectrum demodulation circuit according to claim 2, wherein said first and second delay elements are surface acoustic wave delay lines.

7. A spread spectrum demodulation circuit according to claim 3, wherein said first and second delay elements are surface acoustic wave delay lines.

8. A spread spectrum demodulation circuit according to claim 4, wherein said first and second delay elements are surface acoustic wave delay lines.

9. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 1.

10. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 2.

11. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 3.

12. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 4.

13. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 5.

14. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 6.

15. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 7.

16. A spread spectrum communication apparatus comprising a spread spectrum demodulation unit for demodulating a reception signal to which a quadrature phase shift keying and a spread spectrum modulation are performed, wherein said spread spectrum demodulation unit has the same construction as said spread spectrum demodulation circuit recited in claim 8.

17. A delay-detection-type demodulation circuit comprising:

first and second delay elements for delaying a reception signal, to which a quadrature phase shift keying is performed, to obtain first and second delay signals, respectively;

first and second adders for adding said reception signal and said first and second delay signals to obtain first and second addition signals, respectively;

first and second distributors for distributing said first and second addition signals, respectively;

first and second multiplication circuits for multiplying distributed signals from said first and second distributors to obtain first and second multiplication signals, respectively; and a data demodulation circuit for demodulating said first and second multiplication signals to recover a transmission information signal.

18. A delay-detection-type demodulation circuit according to claim 17, wherein said first delay element has delay amount (D1') of T+(5× a/8)/fc; and said second delay element has delay amount (D2') of T+(−5×a/8)/fc, where T represents one period of a reception signal to be demodulated, fc represents a carrier frequency, and $1/2 \leq a \leq 3/2$.

19. A delay-detection-type demodulation circuit according to claim 17, wherein said first and second delay elements are surface acoustic wave delay lines.

20. A delay-detection-type demodulation circuit according to claim 18, wherein said first and second delay elements are surface acoustic wave delay lines.

21. A delay-detection-type communication apparatus comprising a demodulation unit for demodulating a reception signal to which a quadrature phase shift keying is performed, wherein said demodulation unit has the same construction as said delay-detection-type demodulation circuit recited in claim 17.

22. A delay-detection-type communication apparatus comprising a demodulation unit for demodulating a reception signal to which a quadrature phase shift keying is performed, wherein said demodulation unit has the same construction as said delay-detection-type demodulation circuit recited in claim 18.

23. A delay-detection-type communication apparatus comprising a demodulation unit for demodulating a reception signal to which a quadrature phase shift keying is performed, wherein said demodulation unit has the same construction as said delay-detection-type demodulation circuit recited in claim 19.

24. A delay-detection-type communication apparatus comprising a demodulation unit for demodulating a reception signal to which a quadrature phase shift keying is performed, wherein said demodulation unit has the same construction as said delay-detection-type demodulation circuit recited in claim 20.

* * * * *